United States Patent [19]

Pope et al.

[11] Patent Number: 5,023,208

[45] Date of Patent: Jun. 11, 1991

[54] SOL-GEL PROCESS FOR GLASS AND CERAMIC ARTICLES

[75] Inventors: Edward J. A. Pope, Lake Sherwood; Yoji Sano, Thousand Oaks; Shi-ho Wang, Newbury Park; Arnab Sarkar, West Hills, all of Calif.

[73] Assignee: Orion Laboratories, Inc., Camarillo, Calif.

[21] Appl. No.: 452,962

[22] Filed: Dec. 19, 1989

[51] Int. Cl.$^5$ .............................................. C03C 3/00
[52] U.S. Cl. ........................................... 501/12; 65/17
[58] Field of Search .......................................... 501/12

[56] References Cited

U.S. PATENT DOCUMENTS

| | | | |
|---|---|---|---|
| Re. 32,107 | 4/1986 | January .................................. | 501/12 |
| 4,680,045 | 7/1987 | Osafune et al. ....................... | 65/17 |
| 4,680,048 | 7/1987 | Motoki et al. ........................ | 65/17 |
| 4,681,615 | 7/1987 | Toke et al. ............................ | 65/18.1 |
| 4,707,174 | 11/1987 | Johnson, Jr. et al. ................. | 65/18.1 |
| 4,738,896 | 4/1988 | Stevens ................................... | 428/315.9 |
| 4,765,818 | 8/1988 | Che et al. ............................... | 65/18.1 |
| 4,767,429 | 8/1988 | Fleming et al. ....................... | 65/3.11 |
| 4,775,401 | 10/1988 | Fleming et al. ....................... | 65/3.11 |
| 4,776,867 | 10/1988 | Onorato et al. ....................... | 65/18.1 |
| 4,786,302 | 11/1988 | Osafune et al. ....................... | 65/3.11 |
| 4,786,618 | 11/1988 | Shoup ................................... | 501/12 |
| 4,801,318 | 1/1989 | Toki et al. ............................. | 65/18.1 |
| 4,801,399 | 1/1989 | Clark et al. ........................... | 252/315.01 |
| 4,829,031 | 5/1989 | Roy et al. .............................. | 501/134 |
| 4,839,402 | 6/1989 | Stevens ................................. | 523/200 |
| 4,840,653 | 6/1989 | Rabinovich ........................... | 65/3.12 |
| 4,849,378 | 7/1989 | Hench et al. .......................... | 501/12 |

OTHER PUBLICATIONS

Iler, Ralph K., *The Chemistry of Silica*, John Wiley & Sons, 1979.

*Primary Examiner*—William R. Dixon, Jr.
*Assistant Examiner*—Alan Wright
*Attorney, Agent, or Firm*—Pretty, Schroeder, Brueggermann & Clark

[57] ABSTRACT

An improved sol-gel process is disclosed for fabricating large monoliths of silica or ceramic material, which are substantially free of cracks. Following formation of the gel, but before the gel is dried, the gel is subjected to a hydrothermal aging treatment, in which it is heated in an autoclave to a temperature of between 100° and 300° C., for a time duration of at least about one hour. This hydrothermal aging treatment causes silica (or ceramic) particles to migrate and fill small pores in the porous gel matrix, such that the average pore size increases and capillary forces encountered in the subsequent drying step are reduced to a point where cracking of the gel is substantially eliminated.

9 Claims, 2 Drawing Sheets

SOL-GEL PROCESS FOR GLASS AND CERAMIC ARTICLES

BACKGROUND OF THE INVENTION

This invention relates generally to sol-gel processes for producing monolithic articles of glass and ceramic and, more particularly, to such processes adapted to eliminate cracking of the gel during a final drying step.

High-purity glass and ceramic components typically are fabricated either by a melting of solid raw materials or by vapor deposition. Melting of solid raw materials is a highly effective technique, but difficulty is encountered in maintaining purity, due to recontamination from processing containers at the high melting temperatures. In addition, energy costs due to high temperature processing can sometimes be excessive, and finishing costs to produce components of the desired final shapes also can be expensive. Vapor deposition likewise is highly effective, but very expensive due to a relatively low (e.g., 50%) material collection efficiency, a high investment cost in processing and pollution control equipment, and slow processing rates.

High-purity ceramic components are typically fabricated by processes such as solid extrusion and colloidal casting. Like high-purity glass fabrication processes, these processes also require high temperature processing and the articles fabricated are limited in composition, homogeneity and purity.

Research has recently been conducted into the use of a sol-gel process for fabricating high-purity monolithic articles of glass and ceramic. In such processes, a desired solution, i.e., sol, of glass- or ceramic-forming compounds, solvents, and catalysts is poured into a mold and allowed to react. Following hydrolysis and condensation reactions, the sol forms a porous matrix of solids, i.e., a gel. With additional time, the gel shrinks in size by expelling fluids from the mold. The wet gel is then dried in a controlled environment, to remove fluid from its pores, and is then densified into a solid monolith.

Advantages of the sol-gel process include chemical purity and homogeneity, flexibility in the selection of compositions, processing at relatively low temperatures, and producing monolithic articles close to their final desired shapes, thereby minimizing finishing costs. Nevertheless, the sol-gel process has generally proven to be extremely difficult to use in producing monoliths that are large and free of cracks. These cracks arise during the final drying step of the process, and are believed to result from stresses due to capillary forces in the gel pores. Efforts to eliminate the cracking problem present in sol-gel monoliths have been diverse. However, the problem of cracking has not previously been eliminated without sacrificing one or more the benefits of the process, as listed above.

One technique for eliminating cracking during the final drying step of the glass or ceramic gel is to dry the gel above its hypercritical temperature, with a suitable fluid in an autoclave. Above the critical temperature and pressure, there is no solid/liquid interface in the pores and thus no capillary force exists. The fluids are removed from the pores while in this condition, and a dry gel is thereby obtained. Although this technique is effective, it can be dangerous and it requires relatively expensive equipment.

Another technique for eliminating cracking during the final drying step is to increase the pore size distribution by using various catalysts. However, this approach has not proven to be particularly successful for large monoliths, because no catalyst is believed to be have been found to produce average pore sizes above about 100 Angstroms.

Yet another technique for eliminating cracking during the final drying step is to add colloidal silica particles to the sol, which increases the average pore size and correspondingly increases the solid matrix's strength. Although this technique is generally effective, the presence of colloidal silica particles sacrifices the gel's otherwise inherent homogeneity, thus restricting the range of compositions that can be utilized. In addition, devitrification spots can be created, if mixing of the colloidal silica particles is not perfect.

Yet another technique for eliminating cracking during the final drying step is to add drying control additives to the sol, to produce a more uniform pore size distribution and thereby strengthen the gel matrix. These additives, such as formaldehyde, are then removed during the drying. Although generally effective in eliminating cracking, this technique generally produces monoliths having a large number of bubbles.

It should therefore be appreciated that there is a need for an improved sol-gel process for producing large glass and ceramic monoliths that are substantially free of cracks, without sacrificing other benefits attendant to the sol-gel process, such as low relative expense, chemical purity and homogeneity, flexibility in the selection of compositions, and low temperature processing. The present invention fulfills this need.

SUMMARY OF THE INVENTION

The present invention resides in a sol-gel process for fabricating monoliths of glass and ceramic that are substantially free of cracks, yet that are chemically pure and homogeneous, can vary in composition, can be processed at relatively low temperatures, and are relatively low in cost. In the case of silica, the gel is formed by reacting tetraethyl orthosilicate with water in a mold, which produces a porous silica gel matrix having a high concentration of microscopic pores. In the past, this gel matrix typically would simply be dried to produce the final silica monolith. However, that drying step has frequently led to undesired cracking of the monolith. In accordance with the invention, cracking during the drying step is substantially eliminated by adding an intermediate step of hydrothermally aging the gel matrix, at a prescribed temperature and for a prescribed time duration. This hydrothermal aging increases the average size of the pores in the gel matrix by causing silica particles to migrate and fill small pores, such that capillary forces encountered in the subsequent drying step are insufficient to induce cracking. The entire process can be performed at relatively low temperatures and low cost, and high chemical purity and homogeneity can be achieved for a wide range of compositions.

In other, more detailed features of the invention, the hydrothermal aging step is preceded by a step of immersing the gel matrix in an inert liquid, to displace any remaining reagents (e.g., water and tetraethyl orthosilicate in the case of silica) and thereby substantially terminate any further reaction between the two. The inert liquid advantageously has the same composition as one of the reaction products (e.g., ethyl alcohol in the case of silica). In addition, the step of drying can include a preliminary step of immersing the hydrothermally-aged gel matrix in an inert liquid (e.g., ethyl alcohol in the case of silica), to displace unreacted water, and a subsequent step of heating the gel matrix to evaporate substantially all remaining liquid.

The temperature and time duration prescribed in the step of hydrothermally aging, as well as the gel composition itself, can be specially selected to provide the desired pore size. In the case of silica, these variables preferably are selected such that the average pore diameter is increased to at least 500 Angstroms. Typically, a temperature in the range of 100° to 300° C. and a time duration of at least about one hour are sufficient to achieve this increase.

Other features and advantages of the present invention should become apparent from the following description of the preferred processes, taken in conjunction with the accompanying drawings, which illustrate, by way of example, the principles of the invention.

DESCRIPTION OF THE PREFERRED PROCESSES

Figure 1:
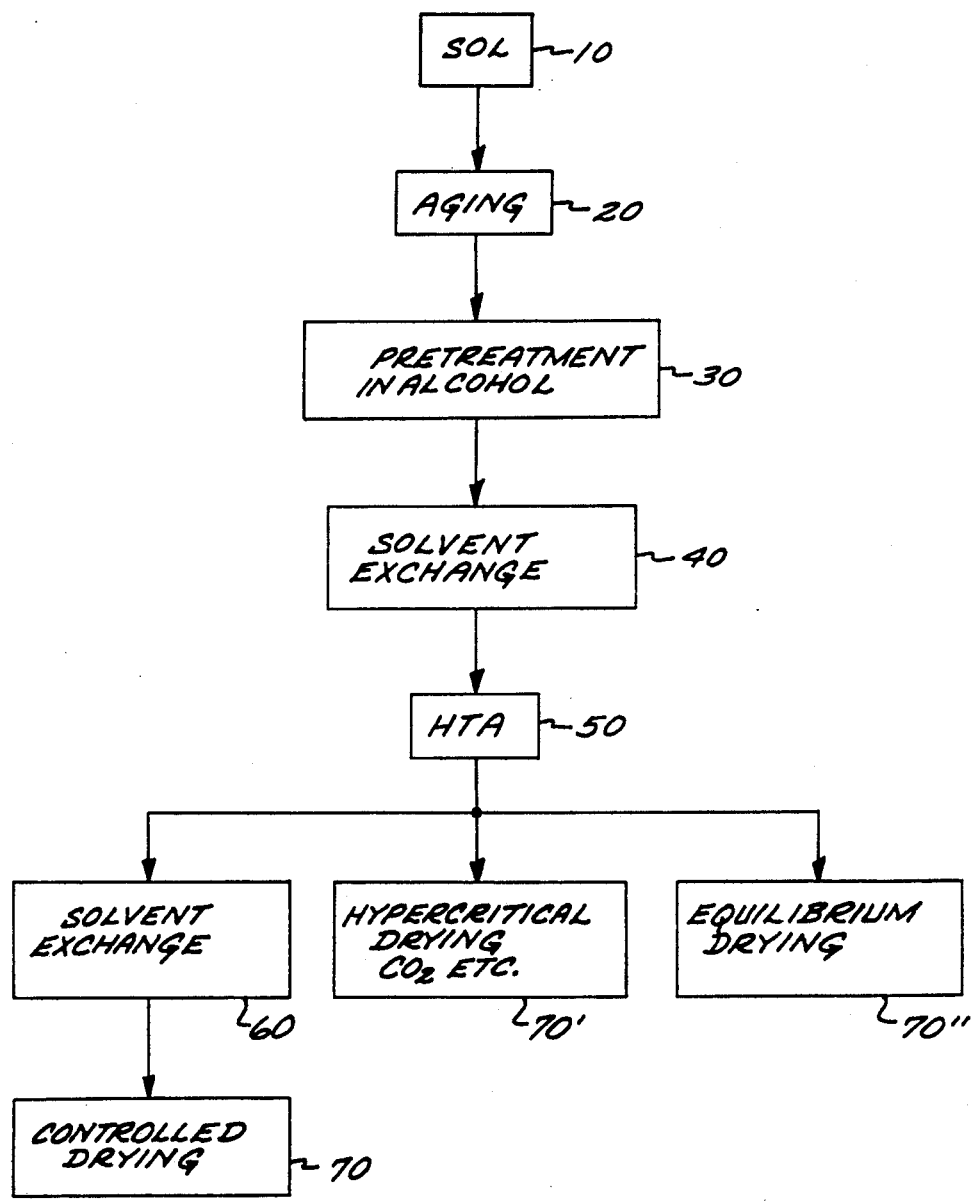
FIG. 1 is a simplified flowchart showing the sequential processing steps followed in fabricating a large silica monolith in accordance with the preferred process of the invention.

With reference now to the illustrative drawings, and particularly to FIG. 1, there is depicted a simplified flowchart of an improved sol-gel process for fabricating large monoliths of silica that are substantially free of cracks. In an initial step 10, tetraethyl orthosilicate ($(C_2H_5O)_4Si$) is thoroughly mixed with deionized water and a hydrofluoric acid (HF) catalyst and with a diluent, ethyl alcohol ($C_2H_5OH$). After stirring and placement in a suitable mold, hydrolysis and polymerization reactions occur and a gel begins to be formed, in step 20. The hydrolysis reaction is as follows:

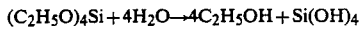

$$(C_2H_5O)_4Si + 4H_2O \rightarrow 4C_2H_5OH + Si(OH)_4$$

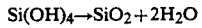

$$Si(OH)_4 \rightarrow SiO_2 + 2H_2O$$

After the hydrolysis reaction and polymerization are complete or near complete, the resulting porous silicon dioxide ($SiO_2$) gel matrix is dried. In the past, cracks have formed in the monolith during the drying step, due to capillary forces of the drying liquid in minute pores of the gel matrix.

The process of the invention overcomes this cracking phenomenon by preceding the drying step with a hydrothermally aging treatment of the gel matrix. In particular, the wet gel is immersed in deionized water in step 40 and allowed to stand, whereby the water drives the hydrolysis reaction to completion. Thereafter, in step 50, the gel, still immersed in water, is placed in an autoclave, where the temperature is raised to at least about 100° C., for at least about one hour. This causes silica particles to migrate and fill the smallest pores, thus increasing the average pore diameter. This reduces the capillary forces that arise during the subsequent drying step and thereby substantially eliminates the cracking problem. Depending on the temperature and duration of the hydrothermal aging step, as well as the silica composition itself, the gel's average pore size can be increased from an initial value of less than 100 Angstroms to as much as 3,000 Angstroms. Generally, an average pore diameter of at least 200 Angstroms is considered sufficient to substantially eliminate the cracking problem.

After the hydrothermal aging step 50, the wet gel can be dried in any of several alternative ways. In one, the gel is first immersed in ethyl alcohol in a step 60, to displace any water remaining within the gel matrix, after which the gel is dried in a step 70 under controlled drying conditions. Preferably the controlled drying occurs very slowly, e.g., over a 15- to 20-day period in the case of a 2-inch diameter cylindrical sample. The pre-soak in ethyl alcohol substitutes for the water a liquid having a greater volatility and reduced surface tension, thereby shortening the subsequent controlled drying step 70 and further reducing capillary forces.

Alternatively, the wet gel can be dried in step 70' by raising its temperature and pressure beyond the critical point, such that capillary forces are avoided altogether. Yet another suitable drying technique utilizes equilibrium drying in a step 70'', in which the gel's pressure and temperature are maintained very close to equilibrium.

Preferably preceding the step 40 of immersion in water and the step 50 of hydrothermally aging can be a solvent exchange step 30 in which the gel is immersed in an inert liquid so as to displace much of the unreacted tetraethyl orthosilicate. In the absence of this step, a secondary precipitation occurs around the matrix of the gel body due to secondary reactions between partially hydrolyzed tetraethyl orthosilicate in the pores and water, resulting in defects in the gel body. This solvent exchange effectively terminates any further reaction. Preferably, the inert liquid is ethyl alcohol, which itself is a product of the water/tetraethyl orthosilicate reaction, thus further acting to terminate the reaction. Whatever tetraethyl orthosilicate remains in the matrix probably is likely to be fairly evenly distributed, such that the subsequent immersion in deionized water (step 40) and hydrothermal aging (step 50) will increase the matrix's density substantially uniformly.

In another alternative feature of the preferred process, colloidal silica particles, 150 to 200 Angstroms in size, can be added to the initial solution. These particles increase the gel's solids content and reduce the creation of small, weak necks in the gel matrix.

The process of the invention will be better understood with reference to the following illustrative examples:

EXAMPLES 1-8

In Examples 1 through 8, 5.64 grams of colloidal silica, identified by the trademark Cab-O-Sil, was added to 66 ml of ethyl alcohol and thoroughly mixed, after which 63 ml of tetraethyl orthosilicate was added and stirring continued. A separate solution of 0.5 grams hydrofluoric acid catalyst in 20.4 ml deionized water also was prepared. The two solutions were then mixed together and well stirred for 30 minutes, after which it was poured into cylindrical molds of polypropylene or polymethyl propylene and allowed to gel. The gel was aged at room temperature for three days, after which time the gel had shrunk away from the wall of the mold so as to facilitate easy removal. Eight gel samples were prepared in this fashion.

A first sample (Example 1) was dried under controlled drying conditions, as explained above, without any hydrothermal aging. The remaining seven samples (Examples 2-8) were transferred to separate cylindrical glass containers, where they were allowed to stand immersed in deionized water for 3 days. Each sample was then individually hydrothermally aged, by placing it still immersed in water in its glass container inside an autoclave, for temperature and pressure regulation. In each case, the temperature was raised at the rate of 1.3° C. per minute to a specified final temperature.

In Example 2, the sample's temperature was raised to 70° C. and held there for one hour, the pressure being 4.52 psi. In Example 3, the temperature was raised to 100° C. and held there for one hour, the pressure being 4.7 psi. In Example 4, the temperature was raised to 125° C. and held there for one hour, the pressure being 33.7 psi. In Example 5, the temperature was raised to 150° C. and held there for one hour, the pressure being 69 psi. In Example 6, the temperature was raised to 200° C. and held there for one hour, the pressure being 225.5 psi. In Example 7, the temperature was raised to 150° C. and held there for two hours, the pressure being 69 psi. Finally, in Example 8, the temperature was raised to 150° C. and held there for three hours, the pressure being 69 psi.

At the conclusion of each hydrothermal aging treatment described above, the autoclave was cooled to ambient temperature and the glass container with the gel body inside, still immersed in water, removed. All seven samples of Examples 2-8 were next transferred into separate glass containers, where they were allowed to stand immersed in ethyl alcohol for two days. The wet gel bodies were then removed and dried under controlled drying conditions. Each sample was then analyzed for microstructural information using a BET machine, and the results are shown in Table 1, below. The data show that, the hydrothermal aging (i.e., HTA) treatment increases the gel's pore size in all cases, with the amount of increase depending on the duration and temperature of the treatment.

TABLE 1

| Sample | HTA Temp. (°C.) | HTA Duration (Hours) | Dry Gel Pore Diameter (Angstroms) |
|---|---|---|---|
| Example 1 | N/A | N/A | 132 |
| Example 2 | 70 | 1.0 | 163 |
| Example 3 | 100 | 1.0 | 263 |
| Example 4 | 125 | 1.0 | 511 |
| Example 5 | 150 | 1.0 | 993 |
| Example 6 | 200 | 1.0 | 3138 |
| Example 7 | 150 | 2.0 | 1581 |
| Example 8 | 150 | 3.0 | 2113 |

Figure 2:
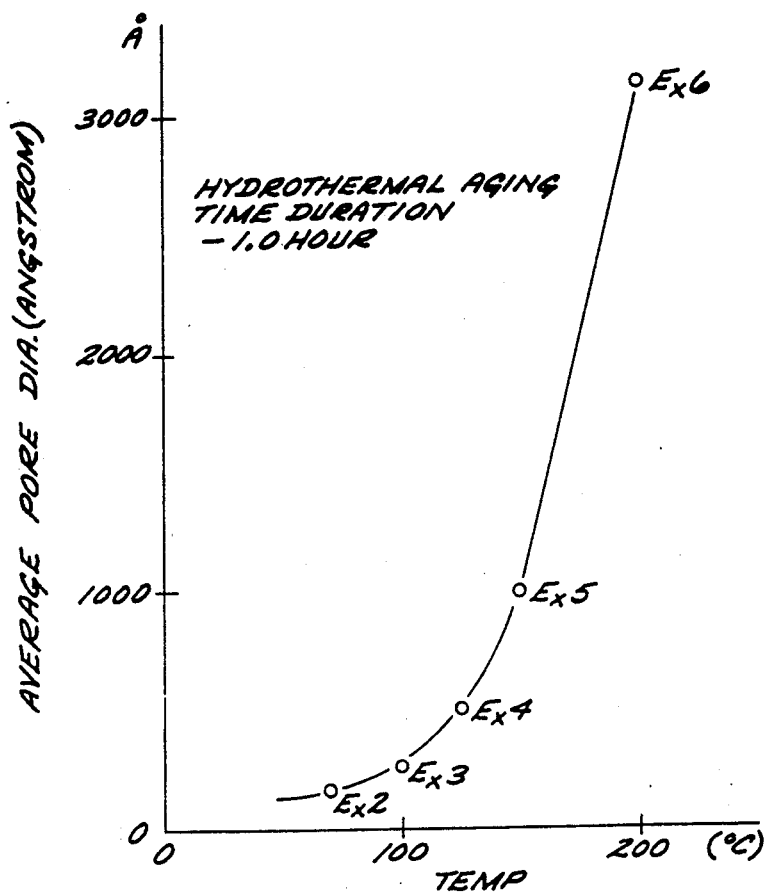
FIG. 2 is a graph illustrating the increase in pore size achieved by hydrothermal aging at a range of temperatures, for a fixed time duration of one hour.
Figure 3:
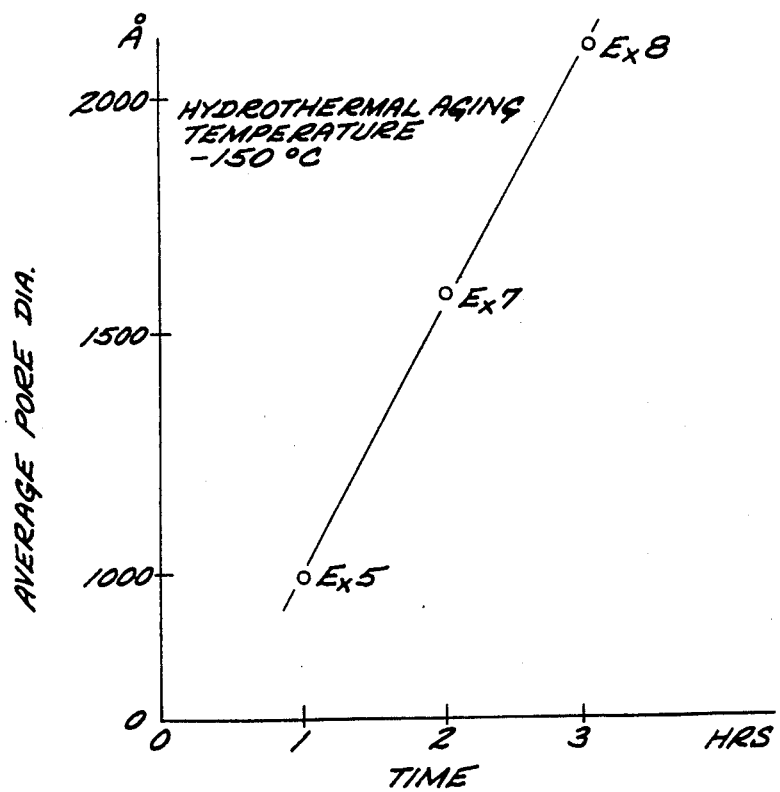
FIG. 3 is a graph illustrating the increase in pore size achieved by hydrothermal aging at a fixed temperature of 150° C., for a time duration range of one to three hours.

The data from Table 1 is presented in graphical form in FIGS. 2 and 3. In particular, FIG. 2 illustrates the effect of the hydrothermal aging treatments temperature on average pore diameter, for a fixed time duration of 1.0 hours. This reflects Examples 2-6. FIG. 3 illustrates the effect of the treatment's time duration on average pore diameter, for a fixed temperature of 150° C. This reflects Examples 5, 7 and 8. It will be observed that average pore diameter increases dramatically with both temperature and time duration.

EXAMPLES 9-14

Six gel samples were produced in a manner identical to that for Examples 1-8, except that colloidal silica was not added to the initial solution. After gel formation, one sample (Example 9) was dried under controlled drying conditions, without any hydrothermal aging. The remaining samples (Examples 10-14), on the other hand, underwent a solvent exchange, in which the samples were separately immersed in ethyl alcohol for three days. In particular, in Example 10, the sample's temperature was raised to 150° C. and held there for one hour, the pressure being 69 psi, while in Example 11 the temperature was raised to 150° C. and held there for three hours, the pressure being 69 psi, in Example 12 the temperature was raised to 150° C. and held there for five hours, the pressure being 69 psi, in Example 13 the temperature was raised to 175° C. and held there for three hours, the pressure being 129.4 psi, and finally in Example 14 the temperature was raised to 190° C. and held there for three hours, the pressure being 182 psi.

Following removal of the samples of Examples 10-14 from the glass containers used in the hydrothermal aging treatment, the wet gel bodies were immersed in ethyl alcohol for two days and then dried under controlled drying conditions. Each sample was analyzed for microstructural information using a BET machine, and the results of these analyses are presented in Table 2. It will be observed that a substantial increase in pore size was realized for all samples, with the amount of increase depending on the hydrothermal aging treatment's temperature, pressure and time duration.

TABLE 2

| Sample | HTA Temp (°C.) | HTA Duration (Hours) | Dry Gel Pore Diam. (Angstroms) |
|---|---|---|---|
| Example 9 | N/A | N/A | 96 |
| Example 10 | 150 | 1.0 | 315 |
| Example 11 | 150 | 3.0 | 426 |
| Example 12 | 150 | 5.0 | 483 |
| Example 13 | 175 | 3.0 | 632 |
| Example 14 | 190 | 3.0 | 993 |

EXAMPLES 15-17

In Examples 15-17, three gel samples were prepared by mixing together a first solution containing 33 ml ethyl alcohol and 63 ml tetraethyl orthosilicate and a second solution containing 0.375 grams hydrofluoric acid and 20.4 ml deionized water. This is the same composition as for Examples 9-14, except that the concentration of the diluent ethyl alcohol was halved, thus tending to accelerate the hydrolysis reaction. After gel formation and removal from its mold, one sample (Example 15) was immediately dried under controlled drying conditions, without any hydrothermal aging. The other two samples (Examples 16-17) underwent the same solvent exchange treatment and hydrothermal aging treatment as the samples of Examples 10-14, with the following parameters: the sample of Example 16 was raised in temperature to 150° C. and held there for two hours, the pressure being 69 psi, and the sample of Example 17 was raised in temperature to 175° C. and held there for two hours, the pressure being 129 psi. After further processing in the same fashion as with previous Examples, the dried samples of Examples 16 and 17 were analyzed for microstructural information using a BET machine, and the results of that analysis are shown in Table 3. It will be observed that a substantial increase in average pore size was realized for both samples.

TABLE 3

| Sample | HTA Temp. (°C.) | HTA Duration (Hours) | Dry Gel Pore Diam. (Angstroms) |
|---|---|---|---|
| Example 15 | N/A | N/A | 130 |
| Example 16 | 150 | 2 | 360 |
| Example 17 | 175 | 2 | 460 |

EXAMPLES 18–20

In these examples, a first solution was prepared containing 16.5 ml ethyl alcohol and 63 ml tetraethyl orthosilicate, and a second solution was prepared containing 1.62 grams nitric acid and 20.4 ml deionized water. The two solutions were thoroughly mixed by stirring and then mixed together and well stirred for 30 minutes. After placement in separate cylindrical molds of polypropylene or polymethyl propylene and aging at room temperature for three days, to form the gels, one sample (Example 18) was immediately removed and dried under controlled drying conditions, without any hydrothermal aging. The remaining two samples (Examples 19 and 20) were thereafter processed in accordance with the same treatment as Examples 16 and 17, respectively. After drying, each sample was analyzed for microstructural information using a BET machine, and the results of this analysis are presented in Table 4. It will be observed that each sample exhibited a substantial increase in pore size over that present in the sample (Example 18) not hydrothermically aged.

TABLE 4

| Sample | HTA Temp. (°C.) | HTA Duration (Hours) | Dry Gel Pore Diam. (Angstroms) |
|---|---|---|---|
| Example 18 | N/A | N/A | 22 |
| Example 19 | 150 | 2.0 | 270 |
| Example 20 | 175 | 2.0 | 360 |

EXAMPLES 21–23

In Examples 21–23, three different compositions were prepared by mixing tetraethyl orthosilicate, ethyl alcohol, and deionized water in the same proportions as described above in Examples 9–14, 15–17, and 18–20. After gel formation and solvent exchange, the three samples were hydrothermically aged by raising their temperatures to 150° C. and maintaining that temperature for two hours. After a subsequent solvent exchange in ethyl alcohol for two days, the samples were dried under controlled drying conditions and analyzed for microstructural information using a BET machine. The results of this analysis are presented in Table 5. It will be observed that, for identical hydrothermal aging parameters, it is possible to control the total pore volume of the gel, and thus the gel matrix's wall thickness, by selecting the ethyl alcohol content in the original sol composition. It will be appreciated that this control of wall thickness is independent of the hydrothermal aging conditions, since all three samples were subjected to identical hydrothermal aging parameters.

TABLE 5

| Tetraethyl Orthosilicate, (Ml) | Ethyl Alcohol (Ml) | Deionized Water (Ml) | Dry Gel Pore Dia (Angstroms) | Total Pore Volume (cc/gm.) |
|---|---|---|---|---|
| 63 | 66 | 20.4 | 314 | 1.91 |
| 63 | 33 | 20.4 | 304 | 1.69 |
| 63 | 16.5 | 20.4 | 310 | 1.47 |

It should be appreciated from the foregoing description that the present invention provides an improved process for fabricating large monoliths of silica and ceramic, which are substantially free of cracks, yet which can be fabricated relatively inexpensively and can have high chemical purity and homogeneity over a wide range of compositions.

Although the invention has been described in detail with reference only to the presently preferred processes, those of ordinary skill in the art will appreciate that various modifications can be made without departing from the invention. Accordingly, the invention is defined only by the following claims.

We claim:

1. A process for fabricating a gel monolith, comprising steps of:
    mixing together prescribed reagents, to produce a liquid solution for placement in a mold;
    allowing the solution to react while in the mold, to produce a porous gel matrix having a high concentration of microscopic pores;
    immersing the porous gel matrix in an inert liquid having the same composition as a product of the reaction of the reagents in the liquid solution;
    hydrothermally aging the porous gel matrix by immersing the matrix in deionized water at a prescribed temperature and for a prescribed time duration, wherein the prescribed temperature and resultant pressure are substantially below the critical temperature and pressure of deionized water; and
    drying the hydrothermally-aged gel matrix, to produce a strong gel monolith substantially free of cracks;
    wherein the step of hydrothermally aging increases the average size of the pores in the gel matrix by causing particles in the gel to migrate and fill small pores, such that capillary forces encountered in the subsequent step of drying are insufficient to induce cracking of the gel matrix.

2. A process as defined in claim 1, wherein the step of drying includes steps of:
    immersing the hydrothermally-aged gel matrix in ethanol for a prescribed time duration, to displace deionized water; and
    heating the gel matrix to evaporate substantially all remaining liquid and produce the strong gel monolith.

3. A process as defined in claim 1, wherein the temperature and time duration prescribed in the step of hydrothermally aging is sufficient to increase the average diameter of the pores in the gel matrix to at least about 500 Angstroms.

4. A process for fabricating a dried silica gel monolith, comprising steps of:
    reacting tetraethyl orthosilicate with water in a mold to produce a porous silica gel matrix having a high concentration of microscopic pores;
    immersing the silica gel matrix in ethyl alcohol for a prescribed time duration, to displace remaining unreacted water and tetraethyl orthosilicate and thereby substantially terminate any further reaction between the two reagents;

hydrothermally aging the silica gel matrix in deionized water at a prescribed temperature and for a prescribed time duration, wherein the prescribed temperature and resultant pressure are substantially below the critical temperature of deionized water; and drying the hydrothermally-aged silica gel matrix, to produce a strong gel silica monolith substantially free of cracks;

wherein the step of hydrothermally aging increases the average size of the pores in the silica gel matrix by causing silica particles migrate to and fill small pores, such that capillary forces encountered in the subsequent step of drying are insufficient to induce cracking of the gel matrix.

5. A process as defined in claim 4, wherein the step of drying includes steps of:

immersing the hydrothermally-aged gel matrix in ethanol for a prescribed time duration, to displace deionized water; and heating the gel matrix to evaporate substantially all remaining liquid and produce the strong silica gel monolith.

6. A process as defined in claim 4, wherein the temperature and time duration prescribed in the step of hydrothermally aging are sufficient to increase the average diameter of the pores in the silica gel matrix to at least about 500 Angstroms.

7. A process as defined in claim 6, wherein:

the temperature prescribed in the step of hydrothermally aging is in the range of 100° to 300° C.; and the time duration prescribed in the step of hydrothermally aging is at least one hour.

8. A process as defined in claim 4, wherein the step of reacting includes steps of:

adding an effective amount of colloidal silica particles to the reacting tetraethyl orthosilicate and water, to increase the gel matrix's solids content and reduce the creation of small, weak necks in the gel matrix; and adding an effective amount of hydrofluoric acid as a catalyst to the reacting tetraethyl orthosilicate and water.

9. A process for fabricating a dried silica gel monolith, comprising steps of:

reacting tetraethyl orthosilicate with water in a mold to produce a porous silica gel matrix having a high concentration of microscopic pores with an average diameter of less than about 100 Angstroms;

immersing the silica gel matrix in ethyl alcohol for a prescribed time duration, to displace remaining unreacted water and tetraethyl orthosilicate and thereby substantially terminate any further reaction between the two reagents;

hydrothermally aging the silica gel matrix in deionized water, at a prescribed temperature in the range of 70° to 200° C., with a resultant pressure of less than 200 psig, and for a prescribed time duration, to cause silica particles to migrate and fill small pores in the matrix, wherein the prescribed temperature and resultant pressure are substantially below the critical temperature of deionized water;

immersing the hydrothermally-aged gel matrix in an inert liquid for a prescribed time duration, to displace deionized water; and heating the hydrothermally-aged silica gel matrix, to evaporate substantially all remaining liquid and produce a strong silica gel monolith substantially free of cracks;

wherein the temperature and time duration prescribed in the step of hydrothermally aging are sufficient to increase the average diameter of the pores in the silica gel matrix to at least about 500 Angstroms, such that capillary forces encountered in the subsequent step of drying are insufficient to induce cracking of the gel matrix.

* * * * *